(12) United States Patent
Ernst et al.

(10) Patent No.: US 7,160,074 B2
(45) Date of Patent: Jan. 9, 2007

(54) GARAGE HOOK

(75) Inventors: Richard J. Ernst, San Diego, CA (US);
George B. Dowse, Huntley, IL (US);
Joseph J. Dunk, Naperville, IL (US);
Cheryl L. Panasik, Elburn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 28 days.

(21) Appl. No.: 10/939,795

(22) Filed: Sep. 13, 2004

(65) Prior Publication Data

US 2006/0056938 A1    Mar. 16, 2006

(51) Int. Cl.
*F16B 45/00*    (2006.01)

(52) U.S. Cl. .................... 411/400; 411/187; 411/387.1; 248/304; 248/110

(58) Field of Classification Search ................ 411/400, 411/401, 386, 387.1–387.8, 187, 176; 248/304, 248/303, 110
See application file for complete search history.

(56) References Cited

U.S. PATENT DOCUMENTS

| | | | | |
|---|---|---|---|---|
| 350,209 A | * | 10/1886 | Parmelee | 411/400 |
| 525,752 A | * | 9/1894 | Tower | 248/303 |
| 1,201,295 A | * | 10/1916 | Handee | 248/217.4 |
| 1,963,799 A | * | 6/1934 | Nelson | 52/37 |
| 3,049,323 A | * | 8/1962 | Peterka | 248/466 |
| 3,263,949 A | * | 8/1966 | Winthrop | 248/74.1 |
| 3,404,476 A | * | 10/1968 | Hoffman, Jr. | 40/620 |
| 4,298,298 A | | 11/1981 | Pontone | |
| 4,441,619 A | | 4/1984 | Gibitz | |
| 4,601,625 A | | 7/1986 | Ernst et al. | |
| 5,059,077 A | * | 10/1991 | Schmid | 411/400 |
| 5,529,449 A | * | 6/1996 | McSherry et al. | 411/31 |
| 5,944,295 A | * | 8/1999 | McSherry | 248/304 |
| 6,003,691 A | | 12/1999 | Owen | |
| 6,484,888 B1 | * | 11/2002 | Miller | 211/5 |
| 6,676,350 B1 | | 1/2004 | McSherry et al. | |
| 2005/0079027 A1 | | 4/2005 | Ernst et al. | |

FOREIGN PATENT DOCUMENTS

| | | |
|---|---|---|
| DE | 9301098 U1 | 3/1993 |
| DE | 29502052 U1 | 3/1995 |
| EP | 0874165 A1 | 10/1998 |
| WO | 2004/053341 | 6/2004 |
| WO | 2004/079209 | 9/2004 |
| WO | 2004/079210 | 9/2004 |

OTHER PUBLICATIONS

U.S. Appl. No. 10/844,706 "Self-Drilling Anchor".
"Existing Garage Hook Solution Summary".

* cited by examiner

*Primary Examiner*—Flemming Saether
(74) *Attorney, Agent, or Firm*—Lisa M. Soltis; Mark W. Croll; Beem Patent Law Firm

(57) ABSTRACT

In one aspect, a holder mountable to a friable substrate may include a self-drilling anchor, a wall engaging flange having an opening for receiving a fastener, and at least one leg extending from the flange for holding an object. In another aspect, a holder may include a self-drilling anchor having a drilling portion longer than a drywall thickness followed by a high-threaded portion, a wall engaging flange, and at least one leg for holding an object. In still another aspect, a holder may include a self-drilling anchor having a screw-like drilling portion longer than a drywall thickness followed by a high-threaded portion, a drywall engaging flange having a recess for receiving a rotary driver and a pair of openings each capable of receiving a threaded fastener and engaging threads thereof.

9 Claims, 2 Drawing Sheets

GARAGE HOOK

BACKGROUND OF THE INVENTION

1. Field of the Invention

The present invention is directed to a holder, commonly a garage hook, mountable in a friable substrate such as drywall, for holding an object such as a household or garden item, e.g., a tool such as a spade.

2. Description of the Related Art

Garage hooks typically are wire-like with a drywall penetrating end that is straight, pointed, and typically threaded like a screw for driving into drywall and sometimes a stud. An opposite end usually forms one of a variety of configurations of hooks. Driving the garage hook commonly is accomplished by gripping and turning the hook end to drive the point and the threads into the drywall.

Anyone who has attempted to install wire-like garage hooks knows that it is easier said than done. A firm, steady, axial, pushing-while-rotating force is needed, and driving typically is stuttered and wobbly. If the user hits a stud squarely, great effort and skill are required to force the point and the threads into the stud, which may cause the threads to strip out the soft, friable drywall, often resulting in an unsightly and uncertain installation. More commonly, the user does not hit a stud, and the installation may look sound but is actually wobbly and loose. Moreover, screw-like threads have little pullout strength in drywall alone and can easily strip out the drywall during installation. In use, the garage hook may turn, particularly after repeated loading, unloading and bumps, causing the garage hook to loosen, fall or dump its load from the wall, resulting in damage to the load, the wall, or other garaged property, such as a car.

For additional pullout strength, some garage hooks, see, e.g., U.S. Pat. No. 6,676,350 to McSherry, rely on large drywall-anchor-like threads. Such garage hooks sometimes require pre-drilling and are often defeated if they hit a stud. Although garage hooks with drywall threads provide higher pullout strength in drywall than screw-like threads, they still usually can only hold objects of light to moderate weight.

Pre-drilling into studs or wood may be considered for many kinds of garage hooks, however, in each case, additional planning, tools and time are required. For example, some garage hooks require one or more screws to be driven, but unless pilot holes are positioned, sized and pre-drilled with great care, efforts to drive screws can result in stripping of the drywall.

Illinois Tool Works Inc., assignee of this application, has made many advances in drywall anchors. An anchor sold under the trademark E-Z ANCOR, see commonly assigned U.S. Pat. No. 4,601,625, is a self-drilling drywall anchor. Another anchor, sold under the trademark STUD SOLVER, see commonly assigned U.S. patent application Ser. No. 60/510,708, is a self-drilling drywall anchor capable of penetrating studs. Until now, however, the improvements in drywall anchor technology have not been reflected in garage hooks.

What is needed is a holder mountable to a friable substrate that may be easily installed for increased pullout resistance and load capacity.

BRIEF SUMMARY OF THE INVENTION

In one aspect of the invention, a holder includes a self-drilling anchor, a wall-contacting flange having an opening for receiving a fastener, and at least one leg for holding an object. The combination of the self-drilling anchor and the fastener may provide increased pullout resistance and load capacity in a friable substrate. The opening may have splines for engaging threads of the fastener to avoid stripping of the drywall by fastener threads. For ease of use and improved performance, the holder may have a recess for receiving a rotary driver for easier and surer installation.

In another aspect of the invention, a holder includes a self-drilling anchor having a drilling portion longer than a drywall thickness followed by a high-threaded portion for engaging the friable substrate, a wall contacting flange, and at least one leg for holding an object. In this configuration, the long drilling portion may bore a hole entirely through the drywall before the high threads begin to engage the drywall. Preferably, the high-threaded portion also is longer than the drywall thickness, so that the high threads may engage the rear drywall surface and add further to the pullout resistance and load capacity.

In still another aspect of the invention, a holder includes a self-drilling anchor having a screw-like distal portion longer than a drywall thickness followed by a high-threaded drywall-engaging portion, a wall contacting flange having a recess for receiving a rotary driver and a pair of openings each capable of receiving a screw and engaging the threads thereof, and a U-shaped pair of legs for holding an object. In this configuration, if a stud is encountered, the screw-like drilling portion may self-drill into the stud. Also, in this configuration, the U-shaped pair of legs, when positioned with its legs aligned with the floor, may be useful for holding a long handled item like a spade. Preferably, the U-shaped pair of legs and pair of flange openings are symmetrical so that when the flange begins to engage the wall, a slight further turn of no more than 180 degrees will position the legs horizontally with one of the screw-engageable openings centered above the legs for increased pullout resistance and load capacity.

These and other features and advantages are evident from the following description of the present invention, with reference to the accompanying drawings.

DETAILED DESCRIPTION OF THE INVENTION

Figure 1:
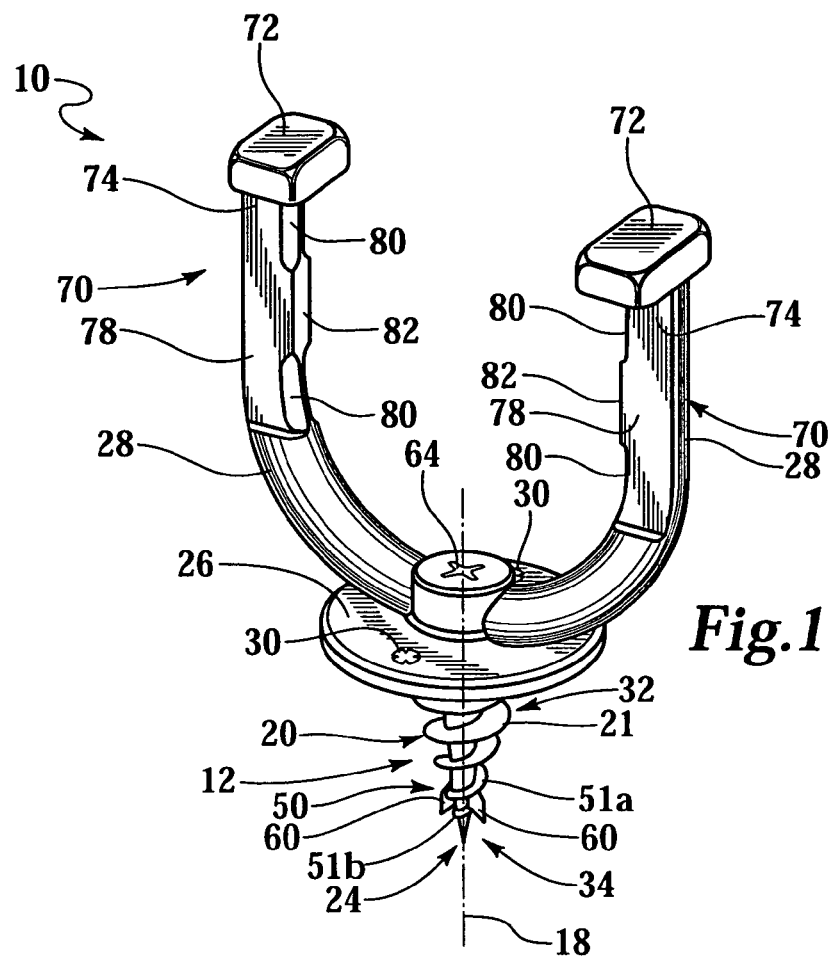
FIG. 1 is a perspective view of a holder mountable to a friable substrate for holding an object.
Figure 4:
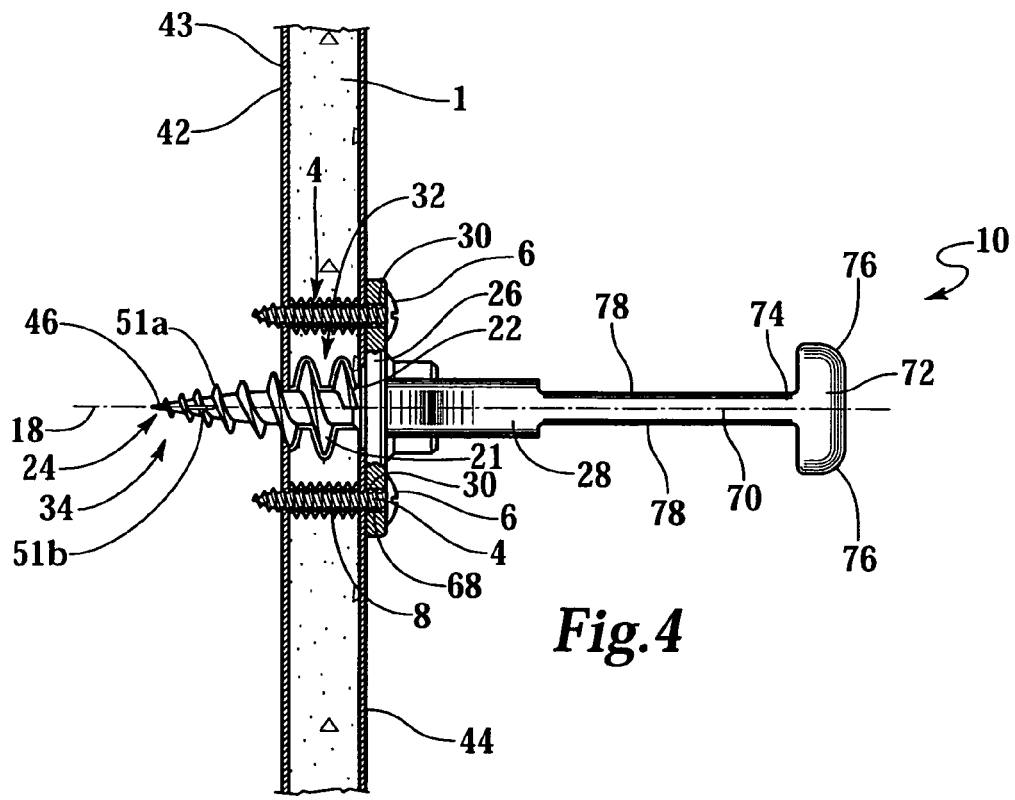
FIG. 4 is a side view of the holder installed within the friable substrate, shown with two fasteners installed.

Referring to FIGS. 1 and 4, a holder 10 includes a self-drilling anchor 12 having axis 18, exterior threading 20 for engaging friable substrate 1, proximal end 22, and drilling end 24, a flange 26 connected to proximal end 22, wherein flange 26 is wider than a largest outer diameter of threading 20 and flange 26 has at least one and preferably a pair of openings 30 spaced from axis 18, each capable of receiving a fastener 4, and at least one and potentially two or more legs 28 extending from flange 26 for holding an object. Holder 10 and fastener 4 spaced from axis 18 provide for higher overall pullout resistance and load capacity for holder 10.

Holder 10 is mountable to a friable substrate 1 and is used for holding, typically hanging, an object (not shown), such as a tool, a ladder, a broom, a spade, a bicycle, or other objects on a friable substrate such as drywall 1. Holder 10 allows a user to select a position anywhere on drywall 1 that is feasible to place the object desired to be held. Holder 10 may be used for holding tools or other objects on interior or exterior friable substrates of a residential home and is particularly useful for hanging tools or other objects from a wall or ceiling within a garage; therefore, holder 10 will be described and shown as a garage hook. However, holder 10 may be equally applicable to other applications.

The friable substrate may be one of several materials used in construction, such as stucco, plaster, or gypsum based drywall 1 sold under the trademark SHEETROCK by United States Gypsum. Drywall 1 typically has a thickness T of about ½ inch or about ⅝ inch, but it may be obtained in other thicknesses, such as about ⅜ inch. Typically, friable substrates such as drywall 1 are mounted to support studs 2, such as wood support studs, for example 2×4 studs or the like, evenly spaced apart, e.g. every 16 inches, or metal support studs, such as steel support studs. Studs 2 are substantially more resistant to pullout than drywall 1 because they are more solid and much less likely to break apart.

In one embodiment, shown in FIG. 4, fastener 4 includes threads 8, and opening 30 engages fastener threads 8 to meter and stop the rotation of fastener 4 before it can strip out drywall 1, providing for threaded engagement between fastener threads 8 and drywall 1 and greater holding strength and pullout resistance. The metering causes fastener 4 to tap mating threads into drywall 1 without stripping out drywall 1, so that fastener threads 8 engage drywall 1 and provide additional overall pullout strength between holder 10 and drywall 1. Holder 10 may be made from a sturdy material such as plastic, nylon, steel or aluminum, and in a preferred embodiment, cast zinc. Even after fastener head 6 abuts flange 26, a user may continue to apply torque to fastener 4 without stripping out drywall 1 because flange 26 is sturdier than drywall 1 and the grip between fastener threads 8 and flange 26 preferably does not allow continued rotation of fastener 4. Preferably, the thickness of flange 26 is large enough so that the inside area of openings 30 is adequate enough to engage fastener threads 8.

The threaded engagement between fastener threads 8 and opening 30 may be accomplished by sizing opening 30 slightly smaller than the outer diameter of fastener 4, providing threading (not shown) within each opening 30 that mates with fastener threads 8, a tapped opening 30 (not shown), or providing splines 68. In one embodiment shown in FIG. 2, flange 26 includes a set of splines 68 which protrude radially into each opening 30. Preferably, splines 68 have a radial extent that defines an inner diameter of each opening 30 that may be smaller than the outer diameter of fastener threads 8. Splines 68 enhance the engagement between fastener threads 8 and opening 30 because fastener threads 8 become threadingly engaged with splines 68, and hence with opening 30 of flange 26. Splines 68 may be formed of zinc during casting of holder 10.

Each opening 30 may be radially spaced from axis 18 so that fastener 4 will be positioned within drywall 1 at a predetermined distance from anchor 12, so that the engagement between fastener 4 and drywall 1 provides additional resistance to pullout. Fastener 4 also rotationally locks holder 10 in place to prevent rotation and loosening of holder 10. Preferably, one of the openings 30 is positioned generally vertically above axis 18, as shown in FIG. 4, so that the increased pullout strength acts to prevent holder 10 from pivoting outwardly away from drywall 1 about anchor 12. It has been found that installing holder 10 with a fastener 4 positioned above axis 18 with fastener threads 8 threadingly engaged in opening 30 and drywall 1 increases the shear load holder 10 can withstand from about 10 to 20 pounds when holder 10 is installed without fastener 4 to about 50 pounds, or more when fastener 4 is inserted through upper opening 30 and engaged with drywall 1.

Figure 2:
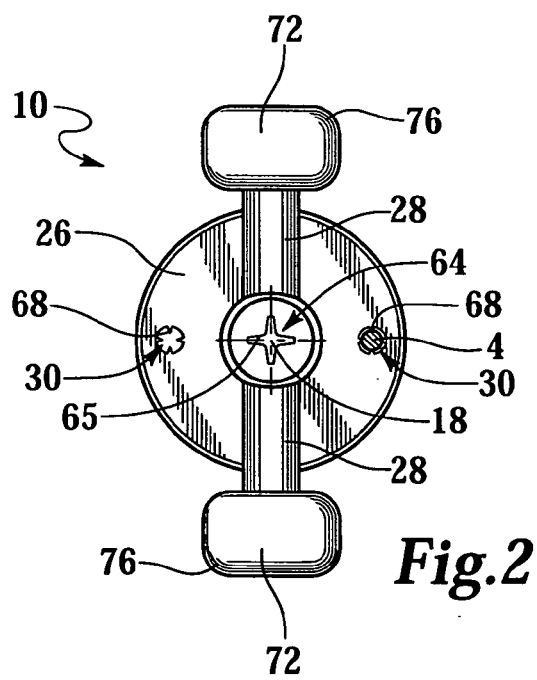
FIG. 2 is an end view of the holder, shown with a cross-section of a fastener installed.

Preferably, at least two openings 30 are included in flange 26, as shown in FIGS. 2 and 4, wherein each opening 30 is spaced from axis 18 and is capable of receiving fastener 4, and preferably each opening 30 is capable of engaging fastener threads 8. Preferably, openings 30 are evenly spaced around flange 26. In the embodiment shown in FIG. 2, wherein there is a pair of openings 30, each opening 30 may be on generally opposite sides of axis 18 and spaced evenly about 180° around axis 18. Openings 30 are preferably symmetrical about axis 18 so that after driving anchor 12 until flange 26 initially contacts drywall 1, a user need not rotate holder 10 more than about an additional 179° to position an opening 30 generally vertically above axis 18. A user also may insert a fastener 4 through the lower opening 30 located vertically below axis 18, which has been found to increase the overall load capacity of holder 10 by approximately an additional 5 to 10 pounds or more over the increased load capacity provided by the fastener 4 mounted in the upper opening 30.

Preferably, holder 10 includes a recess 64, such as the Phillips recess 64 in flange 26 shown in FIGS. 1 and 2, for receiving a rotary driver (not shown) so that holder 10 may be installed with a driving tool, such as a screwdriver or a drill with a screwdriver bit. Recess 64 is preferably coaxial with axis 18 and includes torque transmitting surfaces 65 so that torque may be transmitted from the rotary driver to rotate anchor 12 to drive anchor 12 through drywall 1. A user may also drive anchor 12 through drywall 1 by manually rotating legs 28 of holding portion 14, especially for final positioning after initially driving holder 10 with a rotary driver.

Figure 3:
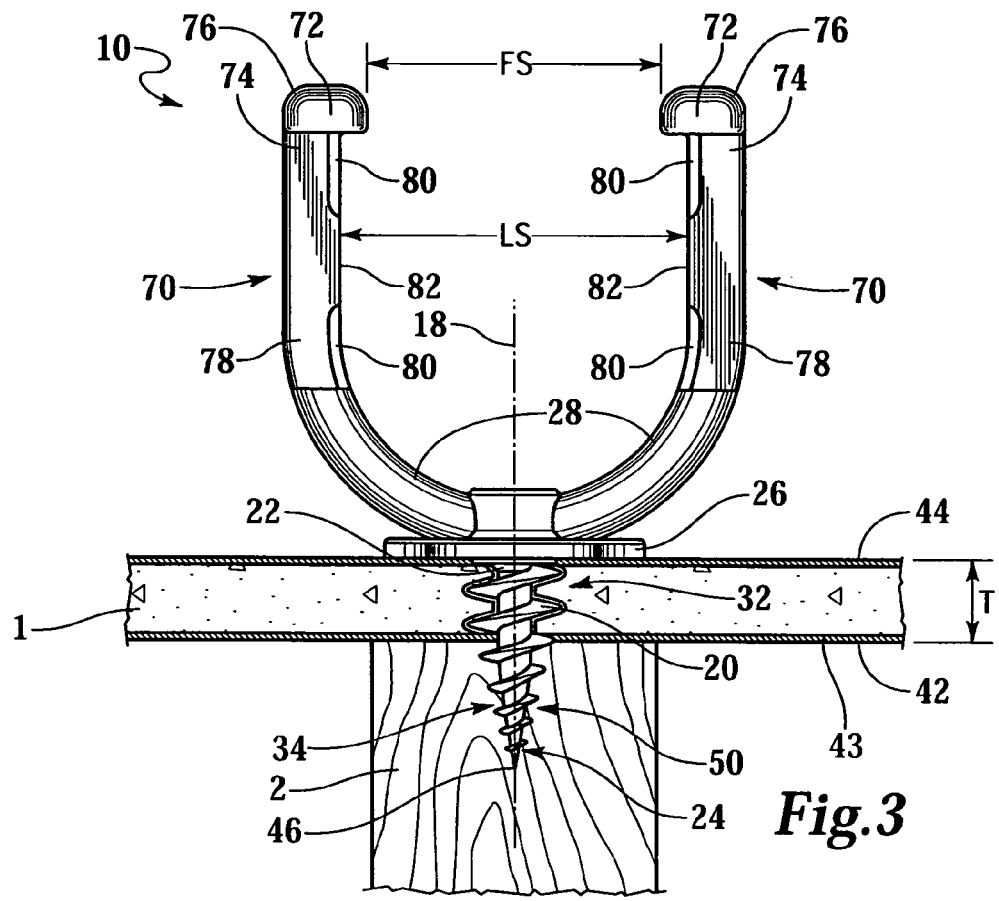
FIG. 3 is a plan view of the holder installed within the friable substrate and a support stud.

One or more legs 28 extend from flange 26, providing a place to hang an object. Legs 28 may come in many configurations, including straight legs, J-shaped legs, C-shaped legs, bicycle hooks, ladder hooks, tool hooks, coat or hat hooks, or a U-shaped pair of legs 28. Each leg 28 may extend axially out from flange 26, as shown in FIGS. 3 and 4, or may extend laterally along outer drywall surface 44.

Continuing with FIGS. 2 and 4, in one embodiment, a pair of legs 28 forms a U-shape. A U-shaped holder 10 may be particularly useful for holding long handled objects, such as a spade or broom, so that the handle fits between legs 28 and the spade blade or the broom head rests on legs 28. Preferably, legs 28 are diametrically opposed, symmetrical about axis 18, and generally aligned in a common plane so that legs 28 may be positioned so they are level and parallel with the floor. Each leg 28 may also include a distal portion 70 that may be generally parallel to axis 18 and each other and generally perpendicular to flange 26. Preferably, each leg 28 has an enlarged foot 72 at distal portion 70, preferably at a distal end 74 of leg 28 to prevent the object from sliding off or tipping over the end of legs 28 and for improved safety.

It may be desirable that the spacing LS between legs 28 be large enough so that a typical handle of a broom or spade, i.e. a cylindrical handle having a diameter of between about 1 inch and about 1½ inches, will fit between legs 28. Preferably, foot 72 protrudes inwardly toward the other leg 28 so that the spacing FS between feet 72 may be smaller than spacing LS between legs 28, as shown in FIG. 3, and upwardly from leg 28, as shown in FIG. 4 to provide a stop on the inside edge of legs 28 to prevent a tool, such as a spade, from sliding between feet 72. In one embodiment, shown in FIGS. 3 and 4, foot 72 has rounded edges 76 facing outwardly for improved safety.

Preferably, the spacing FS and LS between feet 72 and legs 28 is large enough so that the nose of a typical cordless drill adapted with a screwdriver bit will fit between feet 72 and legs 28 so that a user may use the cordless drill to engage recess 64 and rotate holder 10 to drive anchor 12 through drywall. In one embodiment, the spacing LS between the pair of legs 28 may be between about 1½ inches and about 3 inches, preferably about 2 inches. In one embodiment, each foot 72 protrudes inwardly from its corresponding leg 28 between about 1/16 inch and about ¼ inch, preferably about ⅛ inch, so that for a pair of legs 28 with spacing LS of about 2 inches, the spacing FS between feet 72 may be between about 1½ inches and about 1 15/16 inches, preferably about 1¾ inches. Preferably, each foot extends upwardly from legs 28 by between about ¼ inch and about ¾ inch, preferably about ½ inch. In one embodiment, feet 72 are generally symmetrical on either side of legs 28 so that feet 72 extend upwardly and downwardly from legs 28, as shown in FIG. 4.

Continuing with FIGS. 1, 3, and 4, each side of distal portion 70 of each leg 28 may include upper and lower flat surfaces 78 which may be generally parallel to the common plane of legs 28 so that when legs 28 are level, an object laid across flat surfaces 78 will also be level. Legs 28 may also include one or more grooves 80 formed in each leg 28 so that an object may rest within the grooves 80. For example, an object having a thin portion that will be laying on legs 28, i.e. the blade of a shovel or spade, may be hung off legs 28 so that the thin portion rests in grooves 80 to prevent the spade from rolling or sliding along legs 28. In one embodiment, best seen in FIGS. 1 and 2, each leg includes two grooves 80 spaced apart by a stop 82 between flange 26 and foot 72.

Preferably, holder 10 is symmetrical, as shown in FIGS. 2 and 4, so that holder 10 may be functionally the same if it is rotated 180° about axis 18. This symmetry allows a user to drive anchor 12 into drywall 1 so that once flange 26 begins to engage outer drywall surface 44, the user only has to continue to rotate holder 10 slightly, i.e. no more than about an additional 179° before aligning legs 28 horizontally. In addition, if flange 26 has two openings 30 symmetrically spaced 180° apart and positioned equidistantly between legs 28, as shown in FIG. 4, when legs 28 are positioned so that they are level, one of openings 30 may be positioned so that it is generally centered vertically above axis 18 and the other opening 30 may be positioned so that it is generally centered vertically below axis 18 for insertion of fasteners 4 through flange 26 and into drywall 1 for increased pullout resistance and load capacity.

In one embodiment, holder 10 includes self-drilling anchor 12 having axis 18, drilling portion 34 having a length longer than a thickness T of the friable substrate 1 and a high-threaded proximal portion 32 for engaging friable substrate 1, a flange 26 connected to proximal portion 32 of said anchor 12, wherein flange 26 is substantially wider than a largest outside diameter of proximal portion 32, and at least one, and preferably two legs 28 extending from flange 26 for holding an object.

Anchor 12 may have a long unthreaded drilling portion 34 of the type sold under the trademark E-Z ANCOR by ITW Buildex and shown in the commonly assigned U.S. Pat. No. 4,601,625, but preferably has the configuration shown in FIGS. 3 and 4. Because anchor 12 does not receive a fastener, cf. U.S. Pat. No. 4,601,625, anchor 12 may be solid rather than hollow, allowing anchor 12 to have a smaller root diameter while still providing the durability necessary to be driven into drywall 1 and stud 2.

In a preferred embodiment, shown in FIGS. 3 and 4, holder 10 includes self-drilling anchor 12 having axis 18, screw-like drilling portion 34 longer than thickness T of drywall 1 and high-threaded drywall engaging proximal portion 32, a drywall contacting flange 26 coaxially connected to proximal portion 32 of anchor 12, wherein flange 26 is substantially wider than a largest outside diameter of proximal portion 32, and flange 26 has a recess 64 for receiving a rotary driver and a pair of openings 30 each capable of receiving a threaded fastener 4 and engaging threads 8 thereof, and a U-shaped pair of legs 28 for holding an object, wherein each one of the pair of legs 28 extends from flange 26 to a distal portion 70 having a foot 72.

Continuing with FIGS. 3 and 4, in one embodiment, self-drilling anchor 12 includes a high-threaded proximal portion 32 having threading 20 with a crest diameter and a high thread height for engaging drywall 1, and threaded drilling portion 34 longer than a thickness T of drywall 1 and threading 50 with a crest diameter substantially smaller than the crest diameter of proximal portion 32 and a thread height substantially smaller than the thread height of proximal portion 32.

Preferably, the crest diameter of threading 20 of proximal portion 32 is about twice the root diameter of threading 50. In one embodiment, the crest diameter of threading 20 may be between about ¼ inch and about ¾ inch, preferably about ½ inch, the root diameter at proximal portion 32 may be between about ⅛ inch and about ⅜ inch, preferably about ¼ inch, and the thread height of threading 50 may be between about ⅛ inch and about ⅝ inch, preferably about ¼ inch. Preferably, high-threaded proximal portion 32 is slightly longer than drywall thickness T so that high threading 20 is able to engage paper 43 on inner drywall surface 42 to add further to the pullout resistance and load capacity of holder 10. In one embodiment, drywall gripping threading 20 may be one continuous generally helical thread 21 and the root of proximal portion 32 expands tapers from drilling portion 34 toward proximal end 22 so that anchor 12 has enough strength to be driven into wood. In one embodiment, shown best in FIG. 4, anchor includes a flared portion at proximal end 22 that is substantially smaller than flange 26. The flared portion allows a user to more easily continue to rotate holder 10 when the flared portion and flange 26 begin to contact drywall 1 because the user only has to push the small flared portion into drywall 1, and not the entire flange 26.

The screw-like drilling portion 34 with a length longer than drywall thickness T allows anchor 12 to bore a hole entirely through drywall 1 before high threading 20 on proximal portion 32 begins to engage drywall 1. The screw-like smaller threading 50 of drilling portion 34 also allows anchor 12 to be able to grip and drill into stud 2 if a user encounters stud 2 while installing holder 10 because the substantially smaller thread height and crest diameter of drilling portion 34 may be driven into stud 2 without excessive torque. In one embodiment, the crest diameter of threading 50 of drilling portion 34 is between about 1/16 inch and about ¼ inch, preferably about ⅛ inch, and the thread height of threading 50 is between about 0.02 inch and about 0.07 inch, preferably about 0.035 inch Threading 50 may include a generally helical thread 51*a*, as shown in FIG. 4, which may continue as thread 21 on proximal portion 32 so that there may be a continuous thread between drilling portion 34 and proximal portion 32. In one embodiment, drilling portion 34 includes two generally helical threads 51a, 51b arranged in a double helix to provide added support around drilling portion 34, to provide faster engagement of anchor 12 with stud 2, and to provide balanced driving into stud 2. Second thread 51b of the double helix may be present for only a portion of drilling portion 34 proximate drilling end 24, as shown in FIG. 4, or it may continue substantially through all of drilling portion 34 to provide improved grip with stud 2.

Anchor 12 may include a drill tip 46 at drilling end 24. In a preferred embodiment, shown in FIG. 4, drill tip 46 is generally conical in shape and coaxial with axis 18 so that drill tip 46 comes to point at axis 18 to guidedly and quickly engage outer drywall surface 44 and the surface of stud 2. In one embodiment, drilling portion 34 may include at least one wing 60, and preferably a pair of wings 60, that protrudes radially outwardly from drilling portion 34 for reaming out drywall 1 to form a hole having the desired size. Wings 60 are designed to break away when they hit stud 2 so that wings 60 ream out drywall 1 and not stud 2.

METHOD OF USE

Holder 10 may be used by a method including the steps of selecting a location on a wall or ceiling, positioning holder 10 with drill tip 46 against the wall or ceiling at the selected position, rotating holder 10 in a clockwise direction so that anchor 12 drills through drywall 1, continuing to rotate holder 10 until flange 26 begins to engage outer drywall surface 44, preferably manually turning holder 10 to align legs 28 horizontally and so that one of the openings 30 may be generally vertically above axis 18, inserting fastener 4 into the opening 30 that may be above axis 18, driving fastener 4 so that fastener threads 8 threadingly engage opening 30 and drywall 1, driving fastener 4 through drywall 1 until fastener head 6 abuts flange 26, and holding the object off one or both legs 28. The method may also include the step of inserting a second fastener 4 into the other opening 30, driving the second fastener 4 so that threads 8 of the second fastener 4 threadingly engage bottom opening 30 and drywall 1, and driving the second fastener 4 through drywall 1 until head 6 of the second fastener 4 abuts flange 26.

A user may select a position on the wall or ceiling without worrying about the location of a stud 2 located behind drywall 1 because of the configuration of external threading 20 and 50, which allows anchor 12 to drill through drywall 1 and a stud 2. This feature also allows a user to intentionally position holder 10 so that anchor 12 does hit stud 2, because there may be greater hold between anchor 12 and stud 2 because support member may be less likely to break apart than drywall 1. The ability to position holder 10 virtually anywhere along a wall or ceiling allows a user to arrange a plurality of holders 10 on the wall or ceiling for more efficient use of the space allowing a plurality of objects to be held while only needing to install holders 10 and mounting fasteners 4 with a screwdriver or other rotary driver.

The step of rotating holder 10 may be accomplished by inserting a rotary driver into recess 64 in flange 26 and driving holder 10 with the rotary driver, and/or by manually rotating legs 28, which in turn rotates flange 26 and anchor 12. Driving holder 10 with a rotary driver is preferred, at least until final rotary positioning, because it is generally easier to control the driving while keeping holder 10 generally axially aligned.

The holder of the present invention provides for the combination of a self-drilling anchor and an opening spaced from the axis of the anchor for receiving a fastener to increase the overall pullout resistance and load capacity of the holder. In one embodiment, the opening engages threads of the fastener to meter and stop the fastener so that the fastener engages the drywall without stripping it out, increasing engagement between the fastener threads and the drywall. The holder also allows a user to hold an object at virtually any position on a surface of a wall or ceiling, even at a location where a support member may be behind the drywall.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A holder mountable to a friable substrate comprising:
   a self-drilling anchor having an axis, exterior threading for engaging said friable substrate, a proximal end, and a drilling end;
   a flange connected to said proximal end of said anchor, said flange being wider than a largest outside diameter of said exterior threading, said flange having an opening spaced from said axis for receiving a fastener;
   a pair of legs which form a U-shape extending symmetrically about said axis from said flange for holding an object; and
   a recess for a rotary driver centered on said axis between said legs,
   wherein the spacing between said legs is between about 1½ inches and about 3 inches so that the nose of a cordless drill adapted with a screwdriver bit will fit between the legs to engage said recess and rotate said holder to drive said anchor into said drywall;
   wherein each leg has an enlarged foot at a distal end thereof of to prevent the object from sliding off or tipping over the end the legs, wherein each foot is generally flat and oriented generally perpendicular to the axis of the anchor, the feet protrude inwardly from their corresponding leg and are generally symmetrical on either side of the legs so that the feet extend upwardly and downwardly from the legs.

2. A holder according to claim 1, and further including a set of splines protruding radially into said opening for engaging threads of a fastener.

3. A holder according to claim 2, wherein said splines have a radial extent that defines an inner diameter of said opening that is smaller than an outer diameter of threads of a fastener.

4. A holder according to claim 1, further comprising a second opening in said flange spaced from said axis, wherein each opening is capable of receiving said fastener, wherein said openings are generally on opposite sides of said axis.

5. A holder according to claim 1, wherein each foot protrudes inwardly from its corresponding leg between about 1/16 inch and about ¼ inch, and each foot extends upwardly from its corresponding leg by between about ¼ inch and about ¾ inch.

6. A holder according to claim 1, wherein each of said pair of legs further comprises a stop between said flange and said foot.

7. A holder according to claim 1, wherein said holder is cast from zinc.

8. A holder according to claim 1, wherein said self-drilling anchor has a drilling portion having a length longer than a thickness of said friable substrate and a high-threaded proximal portion for engaging said friable substrate.

9. A holder according to claim 1, wherein said self-drilling anchor has a screw-like drilling portion having a length longer than a thickness of said drywall and a high-threaded drywall engaging proximal portion;

a wherein said flange is a wall-contacting flange coaxially connected to said proximal portion of said anchor, said flange being substantially wider than a largest outside diameter of said proximal portion, said flange having a recess for receiving a rotary driver and a pair of openings each capable of receiving a threaded fastener and engaging threads thereof.

* * * * *